United States Patent [19]
Slagle et al.

[11] Patent Number: 5,445,863
[45] Date of Patent: Aug. 29, 1995

[54] CAMOUFLAGE MATERIAL

[76] Inventors: Timothy P. Slagle, Rte. 1, Box 249 A, Lexington, Va. 24450; Keith J. Slale, Rte. 4, Box 325A, Lexington, Va. 24450

[21] Appl. No.: 237,048

[22] Filed: May 3, 1994

[51] Int. Cl.⁶ .............................................. B32B 3/00
[52] U.S. Cl. ................... 428/156; 428/17; 428/18; 428/158; 428/161; 428/162; 428/304.4; 428/314.4; 428/919; 112/420; 112/421; 112/440; 2/94
[58] Field of Search ............... 428/17, 18, 71, 74, 428/156, 158, 161, 162, 304.4, 314.4, 919; 2/94; 112/420, 421, 440

[56] References Cited

U.S. PATENT DOCUMENTS

| D. 59,177 | 10/1921 | Biva . | |
|---|---|---|---|
| D. 120,496 | 5/1940 | Barrott . | |
| D. 163,693 | 6/1951 | Hamre . | |
| D. 265,775 | 8/1982 | Crumley . | |
| D. 297,076 | 8/1988 | Kolpin et al. . | |
| D. 326,363 | 5/1992 | Cooper . | |
| 1,139,642 | 5/1915 | Cox . | |
| 2,166,002 | 7/1939 | Fritsch . | |
| 2,218,740 | 10/1940 | Burke . | |
| 2,351,142 | 6/1944 | Mitchell | 4/10 |
| 4,517,230 | 5/1985 | Crawford | 428/17 |
| 4,656,065 | 4/1987 | Yacovella | 428/17 |
| 4,792,471 | 12/1988 | Lee | 428/17 |
| 4,865,900 | 9/1989 | Shannon | 428/195 |
| 5,203,033 | 4/1993 | Sheppard | 2/69 |

FOREIGN PATENT DOCUMENTS 287974 10/1915 Germany .
902767 8/1962 United Kingdom .

*Primary Examiner*—Patrick J. Ryan
*Assistant Examiner*—Marie R. Macholl
*Attorney, Agent, or Firm*—Richard C. Litman

[57] ABSTRACT

Camouflage sheet material is formed by sandwiching a resilient core material between an inner and an outer layer of fabric or the like, and providing a series of irregularly spaced seams across the material to compress the resilient material along the seams and provide a three dimensional, textured appearance resembling the bark of a tree. The inner and outer layers may be a natural or synthetic fabric, and the core material may be a natural as synthetic fiber or foam material. Multiple layers of the core material may be used for greater depth in the external three dimensional texture, and/or greater insulating properties. The outer layer of material may be patterned with different colors or shadings for greater realism, and may include leaf patterns sporadically placed thereon for greater realism. The sewing process may be automated by gang sewing the seams with pattern repeats. By spacing the seams at the first and second ends of the repeats, each pattern repeat may be blended with the next to provide a smooth and naturally appearing transition. The outer layer of fabric may include a pattern thereon to provide greater realism, including leaves sporadically spaced thereon. The camouflage material is useful for tarps and covers for blinds and the like, and/or may be used to form a suit or garment for a hunter. Pockets, vents, or other openings in such a suit may be formed by slitting along one of the sewn seams to minimize any disruption in the external appearance.

16 Claims, 4 Drawing Sheets

CAMOUFLAGE MATERIAL

FIELD OF THE INVENTION

The present invention relates generally to the aft of camouflage, and more specifically to a fabric material having a relatively thick and resilient core with irregularly sewn seams therethrough, with the seams causing the compression of the core material therealong to produce a three dimensional external texture resembling tree bark or the like. The material may include a pattern thereon providing the proper coloring and simulating leaves or other natural articles associated with the appearance achieved.

BACKGROUND OF THE INVENTION it has been found that there is considerable advantage in being able to blend with one's surroundings in such activities as hunting, military maneuvers, etc., and accordingly, many attempts have been made to develop materials providing for the concealment of the wearer or user against another background. Most of these attempts have been made using a two dimensional printed pattern on a planar sheet of material (e.g., fabric or the like), which, while possibly producing a reasonable facsimile of the background, cannot achieve the effects of light and shadow due to the two dimensional surface. While attempts have been made to create such an effect, such attempts can never be totally successful due to their fixed pattern, when the natural environment is ever changing due to the angle of sunlight and the resulting shadows created, etc.

Moreover, any pattern printed in quantity must be repetitious if produced efficiently; one cannot continually produce new screens for printing ever changing patterns for mass consumption. As a result, even though a particular area of a pattern may appear to be randomized, the repeating of the pattern over a length of material still provides a somewhat synthetic and artificial appearance.

The need arises for a camouflage material which provides a three dimensional, textured external appearance, which appearance closely simulates tree bark or the like. Means must also be provided to break up the repetitious pattern generally found in printed camouflage materials, and thereby provide a realistic, natural appearing material for use in the manufacture of camouflage clothing, covers, and other related articles providing for the concealment of persons or property within.

DESCRIPTION OF THE PRIOR ART

U.S. Pat. No. 1,139,642 issued to Albert S. Cox on May 18, 1915 discloses a Military Uniform Or The Like comprising a printed pattern of elongate irregular alternating light and dark shapes. As the pattern is printed on a planar, two dimensional surface, it cannot provide a true representation of a three dimensional texture, as in the present invention. While three dimensional leaves are disclosed at the shoulders of the uniform, no means of securing them at other locations on the uniform is disclosed; the present material makes use of a pattern of leaves irregularly and sporadically placed thereon.

U.S. Pat. No. 2,351,142 issued to Meldon Mitchell on Jun. 13, 1944 discloses a Camouflaging Method And Device Therefor comprising a multitude of strips attached to a planar sheet material. The sheet may be perforated or alternatingly slit to provide for the expansion thereof. The relatively flaccid strips may provide some movement in a breeze to resemble high grass or the like in a wind, but such a structure and the resulting movement is unlike the relatively fixed appearance provided by the three dimensional bark-like texture of the present invention.

U.S. Pat. No. 4,517,230 issued to Tad E. Crawford on May 14, 1985 discloses an Artificial Camouflage Leaf Construction comprising a central vine-like tape having a plurality of synthetic leaves extending therefrom. The construction merely provides supplemental camouflage for an article, rather than providing complete coverage or concealment, as in the present camouflage sheet material.

U.S. Pat. No. 4,656,065 issued to Thomas R. Yacovella on Apr. 7, 1987 discloses Bark Camouflage Cloth And Outer Garments. The teaching of Yacovella shows that it is desirable to provide a camouflage pattern simulating tree bark, but once again the pattern is imprinted on a two dimensional surface, unlike the three dimensional texture of the present material. Yacovella attempts to provide a shadowed appearance, as in a three dimensional texture, but due to the planar nature of the material, the shadow appearance will not change with changing angles of light, as in a true three dimensional texture as provided by the present camouflage material.

U.S. Pat. No. 4,792,471 issued to Ben R. Lee on Dec. 20, 1988 discloses a Body Wrap Camouflage Strip For Hunters comprising a vine-like strip of material with synthetic leaves attached thereto, in the manner of the Crawford article discussed above. The same limitations exist with Lee as with Crawford.

U.S. Pat. No. 4,865,900 issued to Christopher Shannon et al. on Sep. 12, 1989 discloses an Article Having Concealing Pattern comprising a printed pattern of leaves and twigs. Again, an attempt has been made to simulate the appearance of light and shadow, but such attempts cannot provide full realism on a two dimensional surface, a problem overcome with the present invention.

U.S. Pat. No. 5,203,033 issued to David L. Sheppard, Sr. et al. on Apr. 20, 1993 discloses a Camouflaged Garment comprising a plurality of loops on the outer surface of a garment to which simulated leaves may be attached. The result is a three dimensional effect, but it must rely upon the appearance of the garment itself for full effect. The present material provides a fully realistic three dimensionally textured appearance without need for supplemental three dimensional articles attached thereto.

U.S. Pat. No. D-59,177 issued to Lucien Biva on Oct. 4, 1921 discloses a design for a Textile Fabric Or Similar Article wherein the material is gathered and apparently sewn along straight seams at regular intervals to create a rippled or wrinkled appearance. However, the regular spacing of the seams and their straight lines fail to provide a natural appearance, as is accomplished with the irregular seams of the present invention.

U.S. Pat. No. D-120,496 issued to William E. Barrott on May 14, 1940 discloses a design for a Textile Fabric Or Similar Article comprising a series of regularly sized and spaced parallel pleats. The resulting artificial and synthetic appearance fails to provide the natural appearance of the irregular seams of the three dimensional texture of the present invention.

U.S. Pat. No. D-163,693 issued to Marion R. Hamre on Jun. 19, 1951 discloses a design for a Textile Fabric Or Similar Article comprising a repeating leaf pattern print. The two dimensional print is unlike the three dimensional texture of the present material and cannot provide truly realistic patterns of light and shadow, as provided by the present invention.

U.S. Pat. No. D-265,775 issued to James H. Crumley on Aug. 17, 1982 discloses a design for a Suit formed of a material having an irregular two dimensional pattern imprinted thereon. While Crumley refers to a "switched repeat," in which the left and right halves of the pattern are switched in successive horizontal rows, the evenness of the horizontal rows themselves result in a relatively artificial appearance unlike the three dimensional texture and staggered pattern repeats of the present material.

U.S. Pat. No. D-297,076 issued to Ronald N. Kolpin et al. on Aug. 9, 1988 discloses a design for Camouflage Fabric Or Similar Article comprising a mottled appearance including widely spaced leaves thereon, imprinted on a planar sheet of fabric. The limitations of such two dimensional prints compared to the three dimensional texture provided by the present camouflage material have been discussed above.

U.S. Pat. No. D-326,363 issued to Kevin J. Cooper on Hay 26, 1992 discloses a design for Camouflage Fabric comprising a pattern of leaves providing complete coverage. The result is unlike the three dimensional, bark-like pattern provided by the present camouflage material.

British Patent No. 902,767 to Rudolf G. Ruter and published on Aug. 9, 1962 discloses An Improved Means Of Camouflaging Primarily For Military Use. A planar sheet of material is provided with regular or irregular, intermeshing slits which cause the material to distort from its relaxed, planar state when pulled. The result provides some additional depth to the planar surface and can simulate blowing leaves or the like in a wind. However, no simulation of a tree trunk or the like is provided, as is achieved by the irregular seams and three dimensional texture of the present material.

Finally, German Patent No. 287,974 to Salzmann & Co. published on Oct. 15, 1915 discloses a camouflage pattern comprising a two dimensional print of leaves and branches or twigs The limitations of such two dimensional printed patterns in comparison to the three dimensional texture of the present camouflage material have been discussed above.

None of the above noted patents, taken either singly or in combination, are seen to disclose the specific arrangement of concepts disclosed by the present invention.

SUMMARY OF THE INVENTION

By the present invention, an improved camouflage material is disclosed.

Accordingly, one of the objects of the present invention is to provide an improved camouflage material which includes an inner and an outer layer of planar material sandwiching a core of resilient material therebetween, with irregularly spaced seams randomly sewn thereacross to compress the resilient core material between the inner and outer sheets, thereby providing a three dimensional texture simulating tree bark or the like for at least the outer sheet of material.

Another of the objects of the present invention is to provide an improved camouflage material which seams may form an irregular repeating pattern for automated production, and which repeats have matching first and second ends in order to provide a smooth transition from one repeat to another, and to provide for the staggered assembly of the repeats in order to provide a more random and natural appearance.

Yet another of the objects of the present invention is to provide an improved camouflage material which may include various colors and/or shades, and/or a leaf pattern sporadically placed thereon.

Still another of the objects of the present invention is to provide an improved camouflage material which may be formed of a variety of materials, including natural and/or synthetic fabric for the outer and inner layers, and natural and/or synthetic fibers or open or closed cell foam in one or more layers for the core material.

A further object of the present invention is to provide an improved camouflage material which may be formed into a garment.

An additional object of the present invention is to provide an improved camouflage material which garment formed therefrom may include pockets and/or vents therein, with the pocket openings and vents formed along the seam lines for an unobtrusive and natural appearance.

A final object of the present invention is to provide an improved camouflage material for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the figures of the attached drawings.

DETAILED DESCRIPTION OF THE PREFERRED EMBODIMENTS

Figure 1:
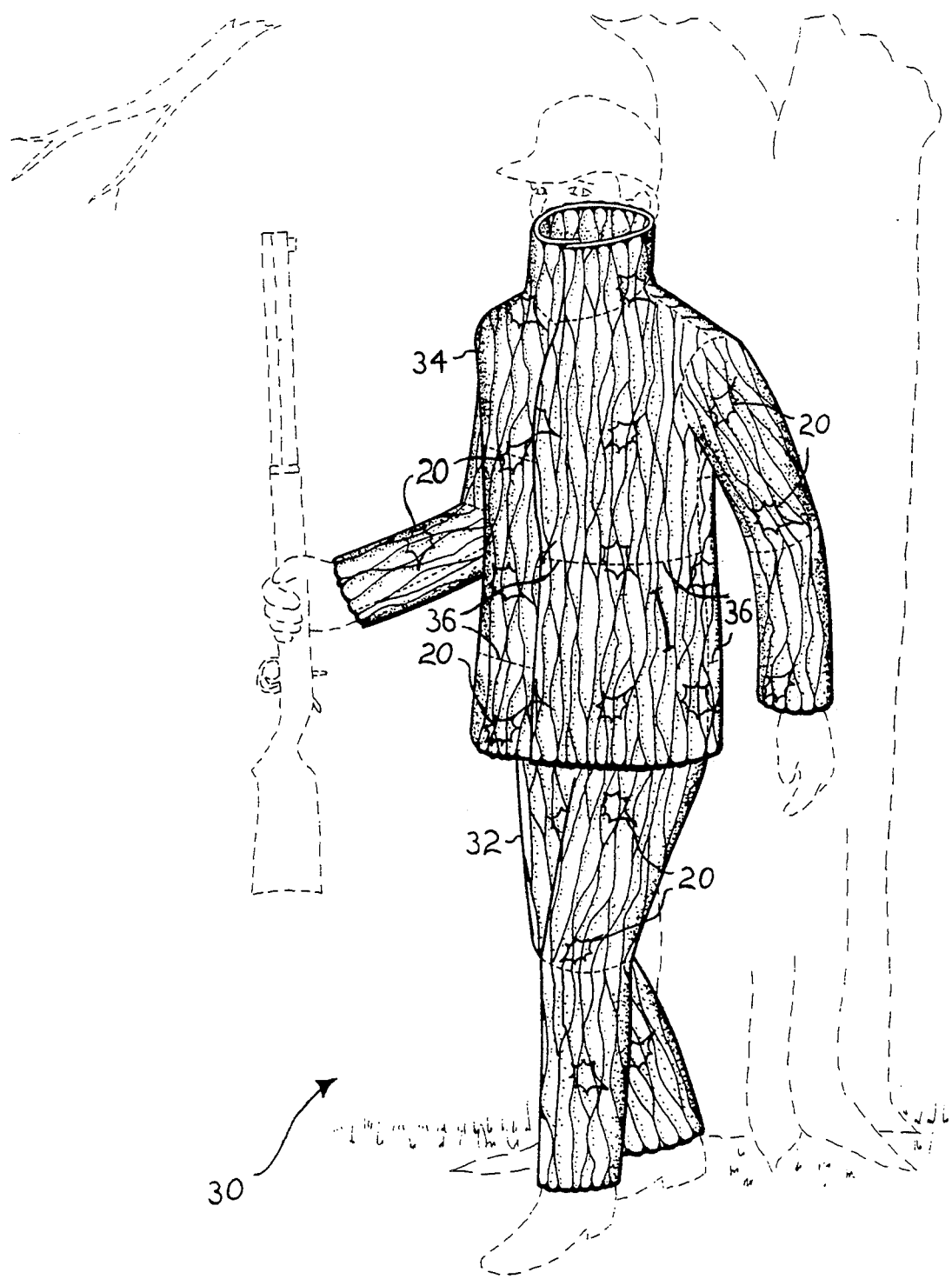
FIG 1 is a perspective view of a camouflage garment made using the material of the present invention.

Referring now to the drawings, the present invention will be seen to relate to a three dimensionally textured camouflage material for use by hunters and/or the military, or others requiring realistic natural concealment in a wooded area. An understanding of the construction of the present material may be obtained by referring to FIGS. 3A and 3B of the drawings.

The present camouflage material is formed in a blanket or composite sheet 1a (FIG. 3A) comprising a first or outer layer 10 and an opposite second or inner layer 12, each of a pliable, planar sheet material, with a relatively thick, resilient core material 14a sandwiched therebetween. The first layer 10 is secured tightly to the second layer 12 (e.g., by stitching, or other alternative means) so that the two opposite layers 10 and 12 are drawn together and the resilient core material 14a is compressed along the (stitched or otherwise formed) seams, generally indicated as 16. As the material 14a forming the core is resilient, it will tend to expand between the seams 16, to form protruding, generally rounded ridges 18 extending from each side of the material.

The seams 16 are formed in a generally elongate, random pattern, in order to resemble the generally elongate ribs or protrusions often found in the bark of a tree. The resultant three dimensional, textured surface of the first layer 10 (and second layer 12) of the present camouflage material sheet I will be seen to provide a reasonably realistic textural resemblance to many, if not most, bark covered exterior surfaces of trees.

Figure 2:
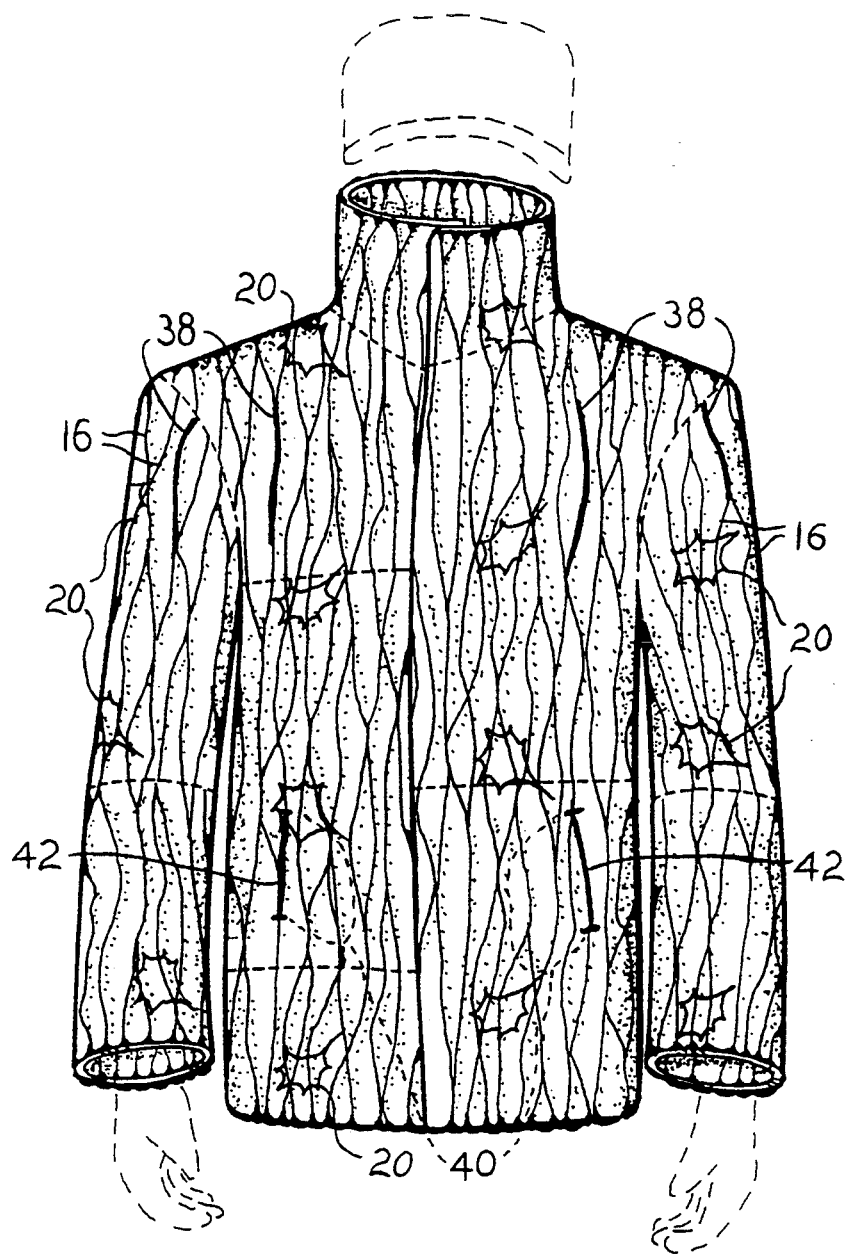
FIG. 2 is a front view of the camouflage coat or jacket of FIG. 1, showing further details.

Additional realism may be obtained through proper coloring, shading, and/or patterns applied to at least the outer or first layer 10, as indicated particularly in FIGS. 1 and 2 of the drawings. Preferably, at least the outer or first layer 10 of the material is provided with a relatively non-reflective, dull finish, as indicated by the stippling shown in FIGS. 1 and 2. Such a finish may be applied over the entire outer layer 10 of material without particular regard for specific shading patterns or lines, as the depressed areas along the seams 16 of the material automatically serve to create relatively dark, shadowed areas in comparison to the protruding ridges 18 of the material.

Figure 4:
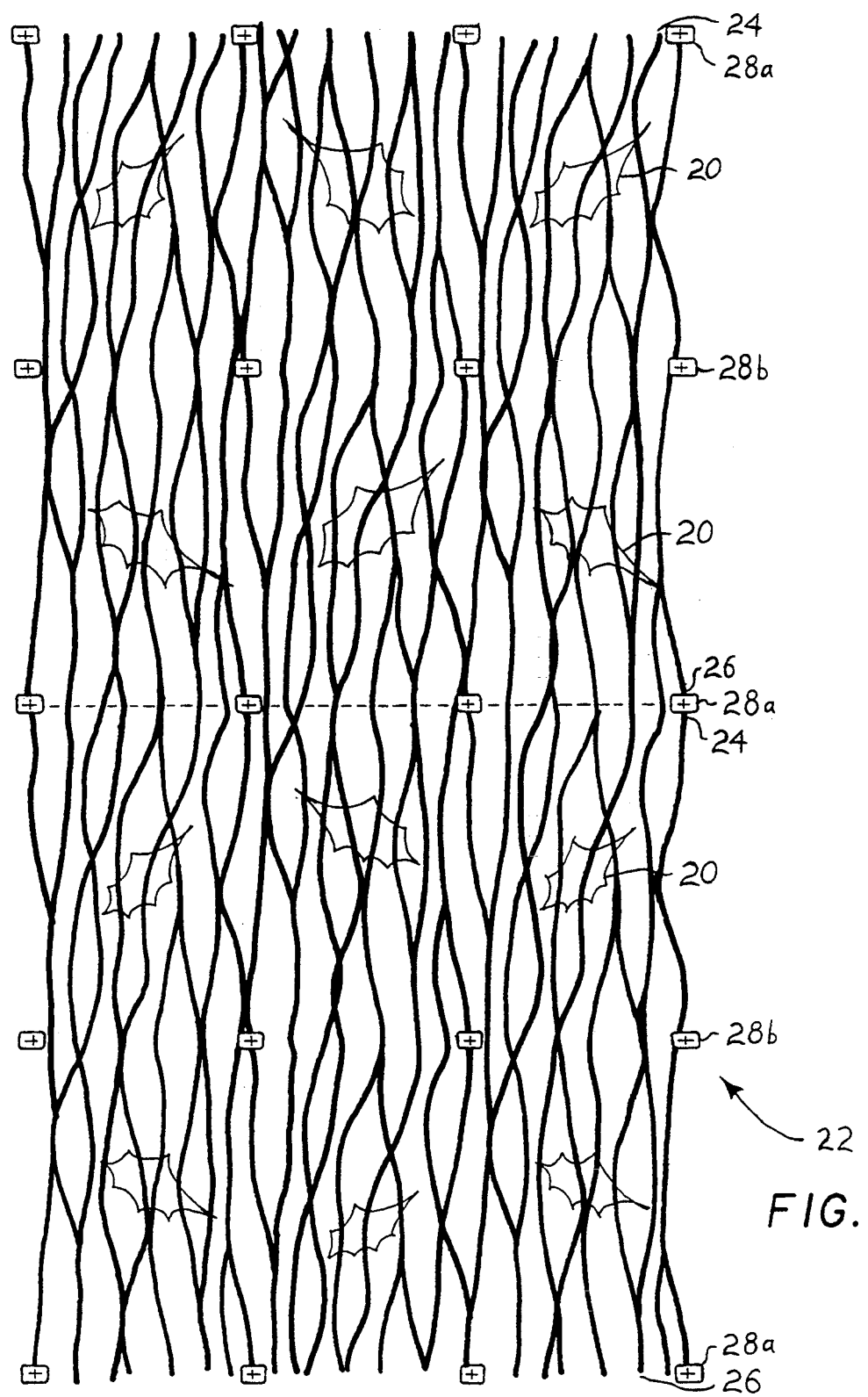
FIG. 4 is a plan view in reduced scale of one repeat of the pattern of the present camouflage material, showing the stitching and other details.

Additionally, an optional pattern of leaves 20 may be placed sporadically over the material to provide a further breakup of the overall pattern, as shown in FIGS. 1 and 2 and in the single repeat of the pattern shown in FIG. 4. The leaves 20 are preferably placed only sporadically over each repeat, in order to avoid overwhelming the general texture of the material. The leaves 20 may be provided in virtually any color as desired, e.g., browns, yellows, and/or reds for fall, etc. As another alternative, the opposite, second layer 12 may be provided with a different pattern, if desired, to provide for the reversibility of the present camouflage material and/or any garment made therefrom, in order to provide camouflage patterns more closely matching different environments.

Figure 3A:
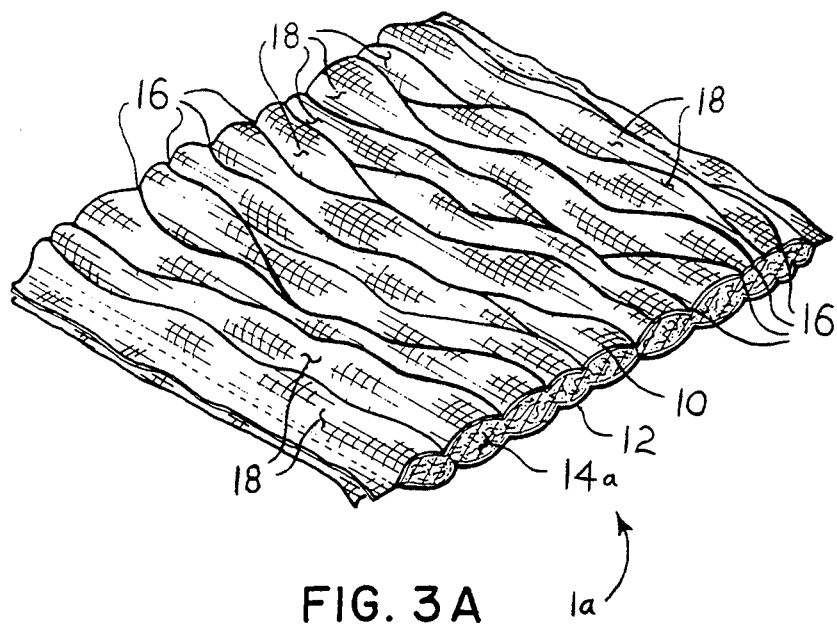
FIG. 3A is a perspective view of a section of the present camouflage material, showing its construction and fiber core.
Figure 3B:
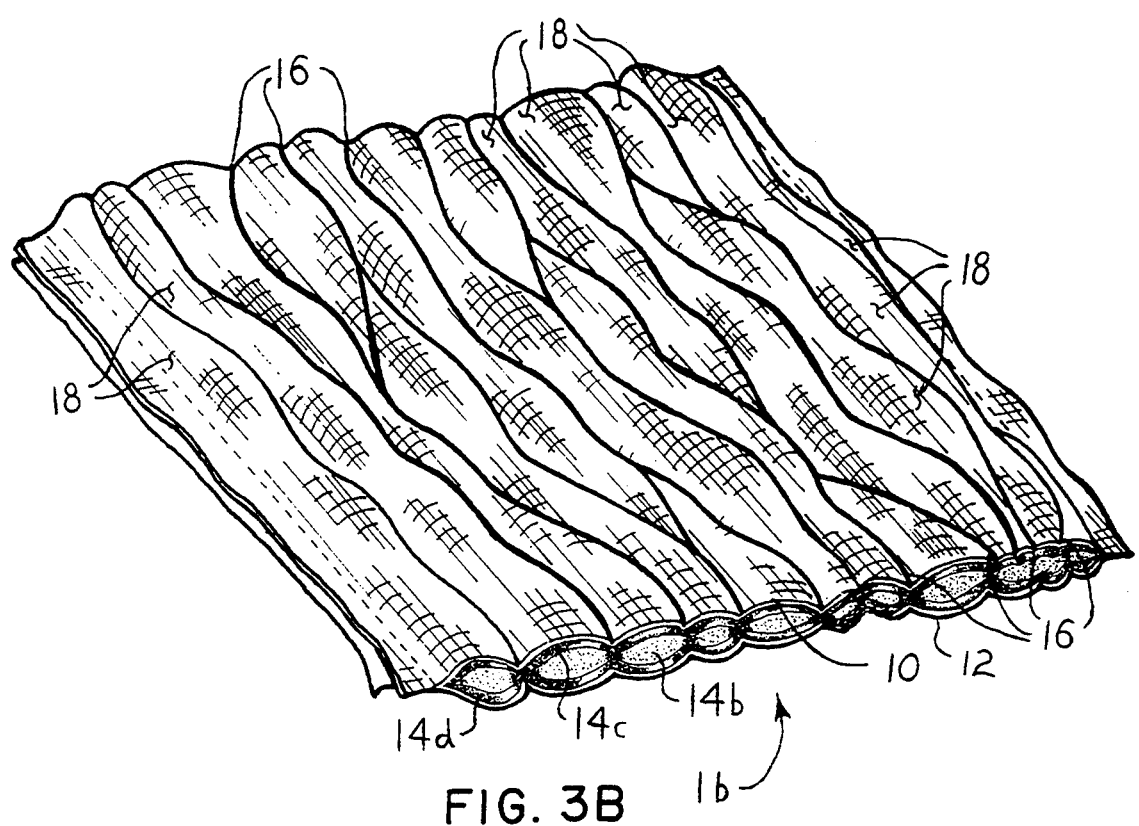
FIG. 3B is a perspective view of another section of the present camouflage material, utilizing a core of foam material.

The camouflage material sheet la of FIG. 3A includes a central core 14a of a fiber material, either natural (cotton, kapok, etc.) or synthetic (polyester, etc.). The sheet 1b of FIG. 3B will be seen to be constructed similarly to the sheet 1a of FIG. 3A, with a first layer 10, and an opposite layer 12 sandwiching a resilient core material therebetween, with seams (e. g., stitching) 16 securing the assembly together and compressing the core material along the seams 16, thereby providing the same protruding rises 18 between each of the seams 16. However, FIG. 3B provides for a foam core 14b, rather than the fiber core material 14a of FIG. 3A. The foam core material 14b may be either an open cell foam, providing relatively low resilience as air is forced from the pores of the material as it is compressed by the seams 16, or alternatively may be a closed cell foam, which material retains trapped gases within the cells for greater resilience. Additional layer(s) of foam material 14c and/or 14d may be provided, as shown in FIG. 3B, for additional textural depth and/or insulation properties, if desired. In a like manner, additional batts or layers of fiber core material 14a may be use in the sheet 1a of FIG. 3A, if desired.

FIG. 4 discloses a view of a typical repeating pattern 22 of the present camouflage pattern. The pattern 22 includes two repeats each having a first end 24 and a second end 26, with a plurality of generally elongate, random seams 16 extending therebetween, to simulate the appearance of typical tree bark. While the pattern of the seams 16 may be random, it will be noted that, due to the repeats, the first end 24 of one repeat will be identical and will match with the second 26 end of that or other repeats, insofar as the spacing between each of the seams 16 is concerned. In order to show this feature better, a series of index points 28 have been included on the pattern 22; these index points 28 are displayed on the drawing figure only to explain and disclose the present invention better, and would not normally be included in an actual pattern 22 according to the present invention.

More specifically, a series of three index points 28a is shown at the upper end, the center, and the lower end of FIG. 4, which points correspond with the first and second ends 24 and 26 of each repeat, and which further correspond with lateral positions across the pattern 22 in which all the seams have the same lateral spacing therebetween. Index points 28b, located at the midpoint of each of the repeats of the pattern 22, will be seen to provide a similar correspondence between seam 16 spacing. Essentially, so long as the present pattern is joined with similar index points matching one another at each repeat, it will be seen that the spacing of the seams 16 forming the bark-like pattern 22 of the present invention will correspond and that multiple repeats of the pattern 22 (or other similarly configured pattern) may be joined end to end to form a continuous length of the present pattern 22.

Such an arrangement lends itself well to manufacturing techniques such as gang sewing of the seams 16, where a plurality of laterally spaced sewing needles travels in a limited lateral distance across the material as it passes beneath the needles, to form such a pattern of seams 16. Generally, such needles are driven laterally by means of cams or the like, which by their nature result in the lateral movement of the needles (and thus the seams 16 being sewn) repeating at each point on the can drive. Thus, the material manufactured using such a technique may be cut at any point along the side of the sheet, and joined end to end with another like sheet at a like point (e.g., index points 28b of FIG. 4), and still provide a smooth, even, and natural looking transition from one repeat to the next, thereby providing a more realistic and natural looking camouflage material.

In order to provide an even more natural appearance, plural rows of repeats of the pattern 22 may be joined along their common edges in order to provide a relatively wide sheet or blanket of the present camouflage material. However, the lateral joining of such rows of repeats with like points on the pattern laterally aligned, could result in a somewhat regular appearance which would not typically be found in natural tree bark and the like. Accordingly, such rows of the repeating pattern 22 may be joined with the midpoint of one repeat (i.e., a point midway between the first and second ends 24 and 26 of one repeat) joined laterally to the lateral seam defining the juncture of the first and second ends 24 and 26 of the laterally adjacent row of repeats, in a staggered array. The result is a much more natural looking camouflage material, with very little evidence visible to the eye that any of the pattern is repeating or is in alignment. Yet, the pattern lends itself to mass manufacture using gang sewing or other similar techniques, for ease of manufacture and economy.

A camouflage suit 30 using the above disclosed techniques is shown in FIG. 1. (It will be understood that the use of the present camouflage material is not limited to the construction of such suits 30, but may be used in the manufacture of relatively large sheets, blankets, or other articles as desired.) The suit 30 of FIG. 1 comprises a pair of pants or trousers 32, and a coat, jacket or the like 34, with the two garments 32 and 34 providing generally complete camouflage coverage for the wearer thereof. A review particularly of the jacket 34 (better seen in FIG. 2) reveals that each of the repeats is staggered relative to its adjacent repeat, as indicated by the staggered lateral seams 36, providing the natural appearance described above for the suit 30.

FIG. 2 discloses further details of the coat or jacket 34. The construction of the present camouflage material, with a relatively heavy layer of core material having a fair amount of thermal insulating value sandwiched between an inner and an outer layer of pliable material, results in a camouflage garment or blanket having fairly good insulating properties, notwithstanding the relatively thin areas along the seams 16. While such may be a desirable side benefit of the present invention in colder conditions, such thermal insulation is less desirable in warmer conditions. Accordingly, optional vents 38 may be provided at various locations in the suit 30 (trousers 32 and/or coat 34), to allow some airflow through the suit 30. By placing such vents 38 along already existing seams 16, as shown in FIG. 2, the vents are rendered relatively unobtrusive and do not detract from the overall natural appearance of the present camouflage suit 30. In a similar manner, pockets 40 may be provided, with a slit opening 42 along a seam 16 in order to provide an unobtrusive and natural appearance, as in the vents 38 discussed above. Such vents 38 and pockets 40 may i,e located at any desired location(s) on the suit, so long as the opening is positioned along a seam 16 to provide a natural appearance and to avoid breaking up the natural lines of the present camouflage suit 30.

In summary and in accordance with the above disclosure, the present invention will be seen to provide camouflage material having a three dimensional texture and closely resembling the natural appearance of a highly textured, three dimensional surface such as tree bark. The three dimensional surface of the present material provides for the application of relatively simple dyes or shading to the outer layer of material due to the relatively high ridges and depressed seams, which automatically provide alternating lighted and shadowed areas just as with any other three dimensional surface, and which lighting and shadowing will automatically blend with that of the surrounding area under similar lighting conditions. Optional camouflage may be added by means of leaf representations placed sporadically over the material, if desired. The present camouflage material lends itself to manufacture using a variety of natural and synthetic materials for both the inner and outer layers, e.g., cotton or polyester fabric, and also the resilient core material sandwiched therebetween. Allowance has also been made for the artificial appearance of a repeating pattern, no matter how natural a single repeat may appear, and the matching of like points of two or more repeats to form a repeating row and the staggered assembly of such rows serve to provide a much more natural appearance than would be the case with conventional assembly techniques. The present material may be assembled in sheets or blankets as desired, but one of the primary applications for such material is in the construction of camouflage suits, as disclosed in FIG. 1. Provision is also made in such suits for pockets and vents, with the vent and pocket openings being relatively concealed by placing them along preexisting seam lines of the suit. Thus, the present camouflage material is useful for various camouflage purposes for hunters, the military, or others who may have need for such material and suits or other garments made therefrom.

It is to be understood that the present invention is limited to the sole embodiments described above, but encompasses any and all embodiments within the scope of the following claims.

I claim:

1. Camouflage material resembling the three dimensional texture of tree bark on the trunk of a tree, comprising:

a first layer and a second layer of pliable sheet material with a resilient core material sandwiched therebetween to provide a compressible core, and;

said first layer and said second layer of pliable sheet material being secured together along spaced apart plural irregular seams formed through said first layer, said second layer, and said resilient core, with said resilient core being compressed along said irregular seams and being uncompressed between said irregular seams to provide irregular generally elongate protruding ridges of material between said irregular seams, with said irregular seams being relatively depressed between said protruding ridges of material to provide a three dimensional texture resembling the irregular ridges and depressions of tree bark.

2. The camouflage material of claim 1 wherein:

said spaced apart plural irregular seams form plural repeating irregular patterns each having a first end and an opposite second end defining a repeat of material, with spacing between each of said irregular seams at each said first end matching the spacing between each of said irregular seams at each said second end, whereby said first end of said repeating irregular patterns of said repeat of material is aligned with said second end of another of said repeating irregular patterns of another said repeat of material to provide a smoothly appearing transition between said repeat of material and said another said repeat of material.

3. The camouflage material of claim 1 wherein:

at least said first layer of pliable material is provided with coloring and shading thereon closely resembling the coloring and shading of tree bark.

4. The camouflage material of claim 1 wherein:

at least said first layer of pliable material comprises a pattern of leaves printed thereon.

5. The camouflage material of claim 1 wherein-:

at least said first layer of pliable sheet material comprises a woven fabric sheet.

6. The camouflage material of claim 5 wherein:

said woven fabric sheet [is formed]consist of a natural fiber.

7. The camouflage material of claim 5 wherein:

said woven fabric sheet consist of a synthetic fiber.

8. The camouflage material of claim I wherein:

said resilient core material comprises a nonwoven fiber material.

9. The camouflage material of claim 8 wherein:
said nonwoven fabric material consists of natural fibers.

10. The camouflage material of claim 9 wherein:
said nonwoven fiber material consist of a synthetic fiber.

11. The camouflage material of claim 1 wherein:
said resilient core material comprises an open cell foam material.

12. The camouflage material of claim 1 wherein:
said resilient core material comprises a closed cell foam material.

13. The camouflage material of claim 1 wherein:
said resilient core material comprises plural layers of resilient material.

14. The camouflage material of claim 1 wherein:
said irregular seams are formed by stitching.

15. A camouflage garment formed of camouflage material resembling the three dimensional texture of tree bark on the trunk of a tree, said camouflage material comprising:
a first layer and a second layer of pliable sheet material, with a resilient core material sandwiched therebetween to provide a compressible core, and;
said first layer and said second layer of pliable sheet material being secured together along spaced apart plural irregular seams formed through said first layer, said second layer, and said resilient core, with said resilient core being compressed along said irregular seams and being uncompressed between said irregular seams to provide irregular generally elongate protruding ridges of material between said irregular seams, with said irregular seams being relatively depressed between said protruding ridges of material to provide a three dimensional texture resembling the irregular ridges and depressions of tree bark.

16. The camouflage garment of claim 15 wherein:
said garment comprises at least a coat and a pair of trousers.

* * * * *